(12) United States Patent
Morimura

(10) Patent No.: US 11,236,822 B2
(45) Date of Patent: Feb. 1, 2022

(54) SHIFT DEVICE

(71) Applicant: KABUSHIKI KAISHA TOKAI-RIKA-DENKI-SEISAKUSHO, Aichi-ken (JP)

(72) Inventor: Kunihiro Morimura, Plymouth, MI (US)

(73) Assignee: KABUSHIKI KAISHA TOKAI-RIKA-DENKI-SAISAKUSHO, Aichi-ken (JP)

( * ) Notice: Subject to any disclaimer, the term of this patent is extended or adjusted under 35 U.S.C. 154(b) by 185 days.

(21) Appl. No.: 15/894,943

(22) Filed: Feb. 13, 2018

(65) Prior Publication Data

US 2019/0249771 A1    Aug. 15, 2019

(51) Int. Cl.
    *F16H 59/08*      (2006.01)
    *F16H 61/22*      (2006.01)

(52) U.S. Cl.
    CPC ............ *F16H 61/22* (2013.01); *F16H 59/08* (2013.01); *F16H 2059/081* (2013.01)

(58) Field of Classification Search
    CPC .......... F16H 61/22; F16H 63/34; F16H 59/08; F16H 2059/081; B60K 2307/126
    See application file for complete search history.

(56) References Cited

U.S. PATENT DOCUMENTS

| | | | | |
|---|---|---|---|---|
| 6,404,354 | B1 * | 6/2002 | Decker | G05G 1/08 200/318 |
| 6,564,661 | B2 * | 5/2003 | DeJonge | B60K 37/06 74/335 |
| 6,987,508 | B2 * | 1/2006 | Numata | G05G 1/10 345/161 |
| 7,053,320 | B2 * | 5/2006 | Kodo | H01H 15/107 200/11 R |
| 9,140,353 | B2 * | 9/2015 | Meyer | B60K 37/06 |
| 9,810,314 | B2 * | 11/2017 | Behounek | F16H 59/08 |
| 2003/0029261 | A1 | 2/2003 | DeJonge | |
| 2008/0115613 | A1 | 5/2008 | Giefer et al. | |
| 2009/0000407 | A1 | 1/2009 | Meyer et al. | |
| 2013/0047768 | A1 | 2/2013 | Kamoshida et al. | |
| 2013/0091972 | A1 | 4/2013 | Morimura | |
| 2016/0153553 | A1 * | 6/2016 | Karlsson | F16H 61/30 701/51 |

FOREIGN PATENT DOCUMENTS

| | | | | |
|---|---|---|---|---|
| DE | 102005056992 A1 * | 5/2007 | ............ | B60K 37/06 |
| EP | 2034383 A2 * | 3/2009 | ............ | B60K 37/06 |
| EP | 3115647 A2 | 1/2017 | | |
| JP | 2002-283868 A | 10/2002 | | |
| JP | 2008-511063 A | 4/2008 | | |
| JP | 2013-047074 A | 3/2013 | | |
| WO | 2011/143178 A2 | 11/2011 | | |
| WO | 2017/055898 A1 | 4/2017 | | |
| WO | WO-2017055898 A1 * | 4/2017 | ............ | F16H 59/08 |

* cited by examiner

*Primary Examiner* — Jake Cook
*Assistant Examiner* — Gregory Robert Weber
(74) *Attorney, Agent, or Firm* — Solaris Intellectual Property Group, PLLC

(57) ABSTRACT

In a shift device, a first mechanism of a restriction mechanism restricts rotation of a knob in one direction, and a second mechanism of the restriction mechanism restricts rotation of the knob in another direction. Drive devices of the restriction mechanism are configured solely by a solenoid of the first mechanism and a solenoid of the second mechanism. This thereby enables configuration of the restriction mechanism to be simplified.

3 Claims, 3 Drawing Sheets

SHIFT DEVICE

BACKGROUND

Technical Field

The present invention relates to a shift device in which a shift position is changed by moving a shift body.

Related Art

US2008/0115613A1 describes an actuating device in which a crank disk is connected to a rotary switch such that the crank disk is capable of rotating as a unit together with the rotary switch. The crank disk is provided with four crank segments, and a stop bolt is provided corresponding to each crank segment. Moreover, the stop bolts are disposed at no fewer than two of the crank segments, thereby restricting rotation of the rotary switch toward both rotation direction sides.

The four stop bolts of this actuating device are driven separately to each other.

SUMMARY

In consideration of the above circumstances, an object of the present invention is to obtain a shift device capable of simplifying the configuration of a restriction mechanism.

A shift device of a first aspect of the present invention comprises a shift body that is movable in one direction or another direction to change a shift position; and a restriction mechanism that includes a first mechanism with an action to restrict movement of the shift body in the one direction and to permit movement of the shift body in the other direction, and a second mechanism with an action to restrict movement of the shift body in the other direction and to permit movement of the shift body in the one direction.

In the shift device of the first aspect of the present invention, the shift position is changed by moving the shift body in the one direction or the other direction. The action of the first mechanism of the restriction mechanism restricts movement of the shift body in the one direction and permits movement of the shift body in the other direction. The action of the second mechanism of the restriction mechanism restricts movement of the shift body in the other direction and permits movement of the shift body in the one direction. Movement of the shift body in the one direction or the other direction is thus restricted by the action of the first mechanism or the second mechanism.

Note that the restriction mechanism is provided with the first mechanism and the second mechanism. This enables the configuration of the restriction mechanism to be simplified.

A shift device of a second aspect of the present invention is the shift device of the first aspect of the present invention, wherein, in a case in which movement of the shift body has been restricted at a position beyond a restriction shift position, a shift position of the shift body is set so as to be at the restriction shift position.

In the shift device of the second aspect of the present invention, in a case in which movement of the shift body has been restricted at a position beyond the restriction shift position, the shift position of the shift body is set so as to be at the restriction shift position. Accordingly, the need to move the shift body in the opposite direction to set the shift position of the shift body so as to be at the restriction shift position can be eliminated.

A shift device of a third aspect of the present invention is the shift device of the first aspect of the present invention, wherein, at a predetermined stimulus, a shift position of the shift body is reconfigured as a predetermined shift position without moving the shift body.

In the shift device of the third aspect of the present invention, at the predetermined stimulus, the shift position of the shift body is reconfigured as the predetermined shift position without moving the shift body. This thereby enables the shift position of the shift body to be set so as to be at the predetermined shift position without moving the shift body.

A shift device of a fourth aspect of the present invention is the shift device of the first aspect of the present invention, wherein the restriction mechanism is disposed outside the shift body.

In the shift device of the fourth aspect of the present invention, the restriction mechanism is disposed outside the shift body. This thereby enables a mechanism other than the restriction mechanism to be disposed inside the shift body.

BRIEF DESCRIPTION OF THE DRAWINGS

Exemplary embodiments of the present invention will be described in detail based on the following figures, wherein.

DETAILED DESCRIPTION

Figure 1:
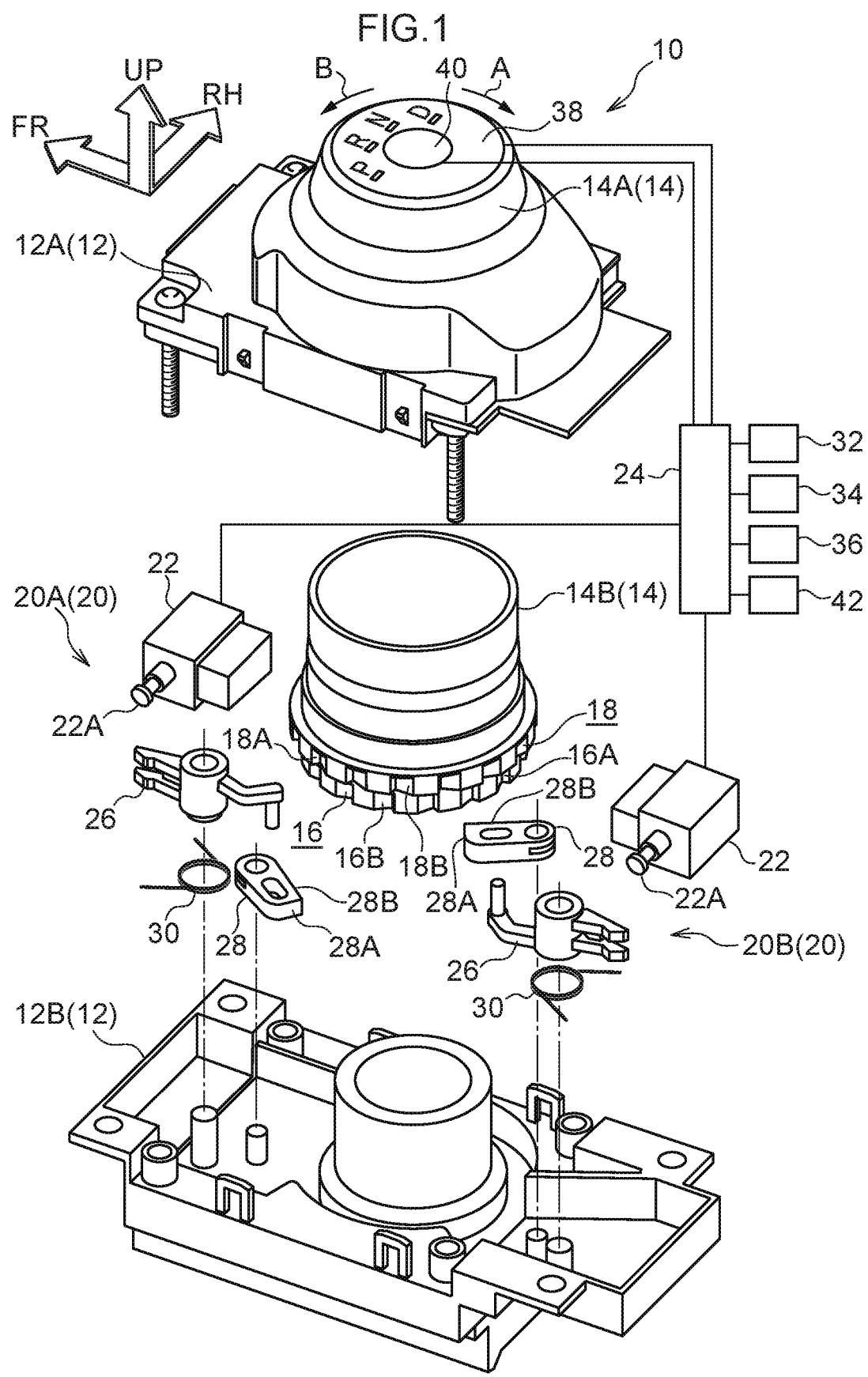
FIG. 1 is an exploded perspective view illustrating a shift device according to an exemplary embodiment of the present invention, as viewed from the oblique rear left.

FIG. 1 is an exploded perspective view illustrating a shift device 10 according to an exemplary embodiment of the present invention as viewed from the oblique rear left. FIG. 2B is a plan view of the shift device 10 as viewed from the upper side. In the drawings, the arrow FR points a forward direction of the shift device 10, the arrow RH points a right direction of the shift device 10, and the arrow UP points an upward direction of the shift device 10.

The shift device 10 according to the present exemplary embodiment is installed on a console (not illustrated in the drawings) of a vehicle (automobile). The shift device 10 is disposed at the vehicle front side and vehicle width direction inside of a driver's seat (not illustrated in the drawings) of the vehicle. The forward direction, right direction, and upward direction of the shift device 10 respectively face in the forward direction, right direction, and upward direction of the vehicle.

As illustrated in FIG. 1 and FIG. 2B, the shift device 10 is provided with a substantially cuboid box-shaped case 12, serving as a vehicle body side and a support body. The case 12 is disposed within the console. A case upper 12A is provided at the upper side of the case 12, and a case lower 12B is provided at the lower side of the case 12. The case 12 is configured by combining the case upper 12A and the case lower 12B together.

A substantially circular cylinder shaped knob 14, serving as a shift body (operation body) is supported inside the case 12. The knob 14 is capable of rotating (moving) about an axis. A knob upper 14A is provided at the upper side of the knob 14, and a knob lower 14B is provided at the lower side of the knob 14. The knob 14 is configured by combining the knob upper 14A and the knob lower 14B together such that the knob upper 14A and the knob lower 14B are capable of rotating together as a unit. The knob upper 14A projects toward the upper side from the case 12, and projects into the vehicle cabin from the console. The knob upper 14A of the knob 14 is capable of being rotation operated in one direction (the arrow A direction in FIG. 1, etc.) and in another direction (the arrow B direction in FIG. 1, etc.) by a vehicle occupant. The knob 14 can be rotated from the other direction side toward the one direction side so as to place the knob 14, in sequence, at shift positions of: a P position (parking position, a predetermined shift position, a restriction shift position); an R position (reverse position); an N position (neutral position, specific shift position); and a D position (drive position, restriction shift position).

A lower portion of the knob 14 (lower portion of the knob lower 14B) is formed with plural first recesses 16, serving as first restricted portions and each having a triangular cross-section profile. The first recesses 16 are disposed at a uniform spacing around the circumferential direction of the knob 14. A placement angle spacing of the first recesses 16 is the same as a rotation angle spacing between the shift positions of the knob 14. A face on the other direction side of each first recess 16 configures a restricted face 16A, and a face on the one direction side of each first recess 16 configures a permitted face 16B. The angle of the restricted faces 16A with respect to a radial direction of the knob 14 is set smaller than the angle of the permitted faces 16B with respect to the radial direction of the knob 14.

A lower portion of the knob 14 at the upper side of the first recesses 16 is formed with plural second recesses 18, serving as second restricted portions and each having a triangular cross-section profile. The second recesses 18 are disposed at a uniform spacing around the circumferential direction of the knob 14. A placement angle spacing of the second recesses 18 is the same as the rotation angle spacing between the shift positions of the knob 14. A face on the one direction side of each second recess 18 configures a restricted face 18A, and a face on the other direction side of each second recess 18 configures a permitted face 18B. An angle of the restricted faces 18A with respect to the radial direction of the knob 14 is set smaller than an angle of the permitted faces 18B with respect to the radial direction of the knob 14.

A restriction mechanism 20 is provided inside the case 12. The restriction mechanism 20 is provided with a first mechanism 20A at the front side of the knob 14, and a second mechanism 20B at the rear side of the knob 14.

The first mechanism 20A and the second mechanism 20B are each provided with a solenoid 22 serving as a drive device. The solenoids 22 are fixed inside the case 12. The solenoids 22 are electrically connected to a vehicle controller 24. The solenoid 22 of the first mechanism 20A is driven under the control of the controller 24 to actuate the first mechanism 20A. The solenoid 22 of the second mechanism 20B is driven under the control of the controller 24 to actuate the second mechanism 20B.

In both the first mechanism 20A and the second mechanism 20B, a base end side portion of a link 26, serving as an actuation member, is mechanically connected to an output shaft 22A of the solenoid 22. A central portion of the link 26 is rotatably supported inside the case 12.

In both the first mechanism 20A and the second mechanism 20B, a leading end side portion of a substantially rectangular column shaped pawl 28, serving as a restriction member, is mechanically connected to a leading end portion of the link 26. A base end side portion of each pawl 28 is swingably supported inside the case 12. The pawl 28 of the first mechanism 20A is disposed at an up-down direction position corresponding to the first recesses 16 of the knob 14, and the pawl 28 of the second mechanism 20B is disposed at an up-down direction position corresponding to the second recesses 18 of the knob 14. A leading end face of each pawl 28 configures a restriction face 28A, and a face on the knob 14 side of each pawl 28 configures a permission face 28B. The restriction face 28A and the permission face 28B are disposed at substantially right angles to one another.

In both the first mechanism 20A and the second mechanism 20B, a torsion spring 30, serving as an urging member, spans between the link 26 and the case 12. Each torsion spring 30 urges the link 26 in one rotation direction, and urges the pawl 28 in a swing direction toward the knob 14 side.

Figure 3A:
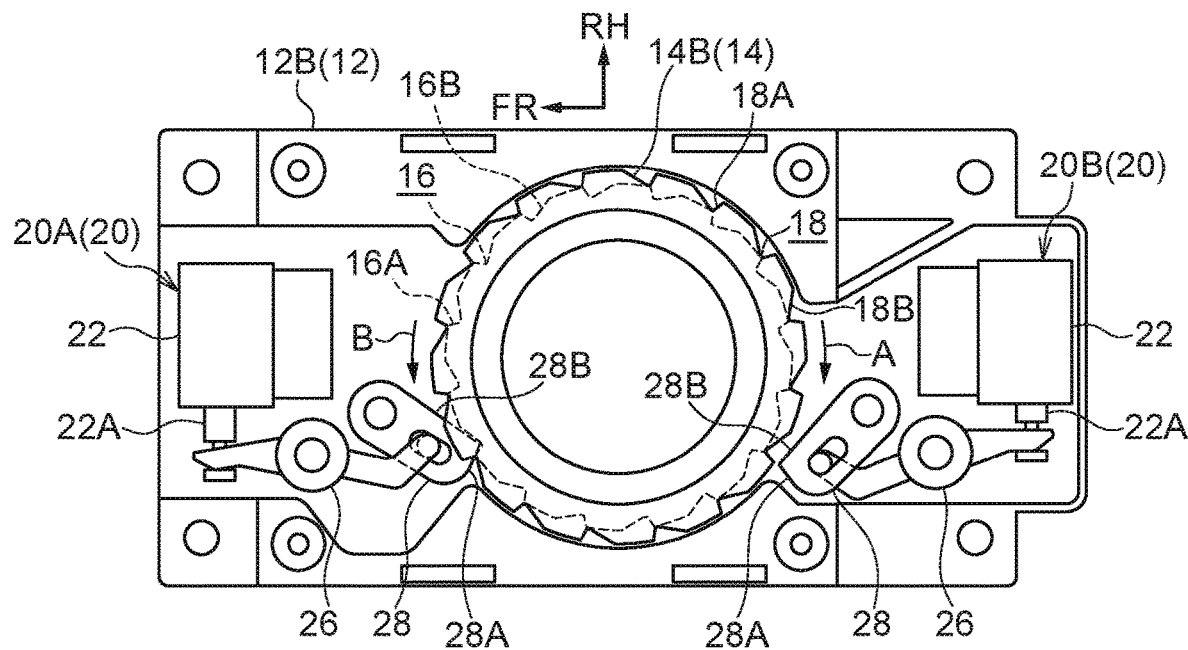
FIG. 3A is a plan view viewed from above, illustrating a state in which the knob of the shift device according to the exemplary embodiment of the present invention is restricted from rotating in one direction.

While the knob 14 is disposed at a shift position, when the first mechanism 20A is not actuated, the leading end portion of the pawl 28 of the first mechanism 20A is inserted into one of the first recesses 16 of the knob 14 by the urging force of the torsion spring 30 (see FIG. 3A). Accordingly, the restriction face 28A of the pawl 28 engages with the restricted face 16A of the first recess 16, thereby restricting (locking) rotation of the knob 14 in the one direction. Moreover, the permission face 28B of the pawl 28 engages with the permitted face 16B of the first recess 16, thereby permitting rotation of the knob 14 in the other direction against the urging force of the torsion spring 30.

Figure 3B:
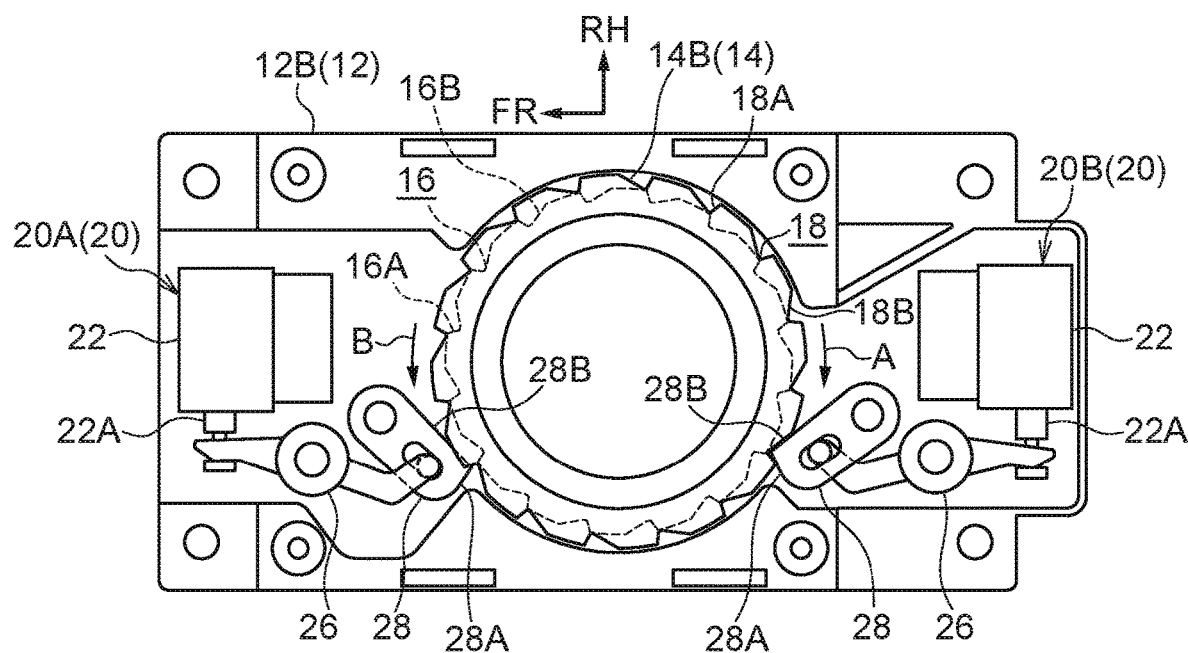
FIG. 3B is a plan view viewed from above, illustrating a state in which the knob of the shift device according to the exemplary embodiment of the present invention is restricted from rotating in another direction.

While the knob 14 is disposed at a shift position, when the second mechanism 20B is not actuated, the leading end portion of the pawl 28 of the second mechanism 20B is inserted into one of the second recesses 18 of the knob 14 by the urging force of the torsion spring 30 (see FIG. 3B). Accordingly, the restriction face 28A of the pawl 28 engages with the restricted face 18A of the second recess 18, thereby restricting (locking) rotation of the knob 14 in the other direction. Moreover, the permission face 28B of the pawl 28 engages with the permitted face 18B of the second recess 18, thereby permitting rotation of the knob 14 in the one direction against the urging force of the torsion spring 30.

When the first mechanism 20A and the second mechanism 20B have been actuated (see FIG. 2B), in both the first mechanism 20A and the second mechanism 20B, the solenoid 22 is driven, thereby rotating the link 26 against the urging force of the torsion spring 30, and swinging the pawl 28 toward the opposite side to the knob 14. The leading end portions of the respective pawls 28 therefore leave the first recess 16 or the second recess 18, such that the pawls 28 permit (unlock) rotation of the knob 14 in the one direction and the other direction.

A detector 32 is provided inside the case 12. The detector 32 detects a rotation position of the knob 14 to detect the shift position of the knob 14, and is electrically connected to the controller 24. An automatic transmission 34, serving as a vehicle transmission, is electrically connected to the controller 24. When the knob 14 is disposed at the P position, the R position, the N position, or the D position (when the detector 32 detects that the knob 14 has been disposed at the P position, the R position, the N position, or the D position), a shift range of the automatic transmission 34 is changed to a P range (parking range), an R range (reverse range), an N range (neutral range), or a D range (drive range) corresponding to the respective shift positions of the knob 14 under the control of the controller 24. The controller 24 is also electrically connected to an engine 36 of the vehicle.

A substantially annular column shaped indicator 38, serving as a displaying device, is supported inside the case 12. The indicator 38 is disposed at the inside of the knob 14, and is exposed inside the vehicle cabin. The indicator 38 is electrically connected to the controller 24, and the indicator 38 displays the shift position of the knob 14 to the occupant under the control of the controller 24.

A substantially circular column shaped switch 40, serving as an operation section, is supported inside the case 12. The switch 40 is disposed at the inside of the indicator 38, and is exposed inside the vehicle cabin. The switch 40 is capable of being operated to restrict and operated to release by the occupant. The switch 40 is electrically connected to the controller 24.

A vehicle brake 42, serving as an operation section, is electrically connected to the controller 24. The brake 42 is operated by the occupant in order to brake the vehicle.

Next, explanation follows regarding operation of the present exemplary embodiment.

In the shift device 10 configured as described above, when the knob 14 is rotated in the one direction (arrow A direction), the shift position of the knob 14 is changed in the sequence of the P position, the R position, the N position, and the D position. When the knob 14 is rotated in the other direction (arrow B direction), the shift position of the knob 14 is changed in the sequence of the D position, the N position, the R position, and the P position. The shift position of the knob 14 is displayed by the indicator 38 under the control of the controller 24.

Figure 2A:
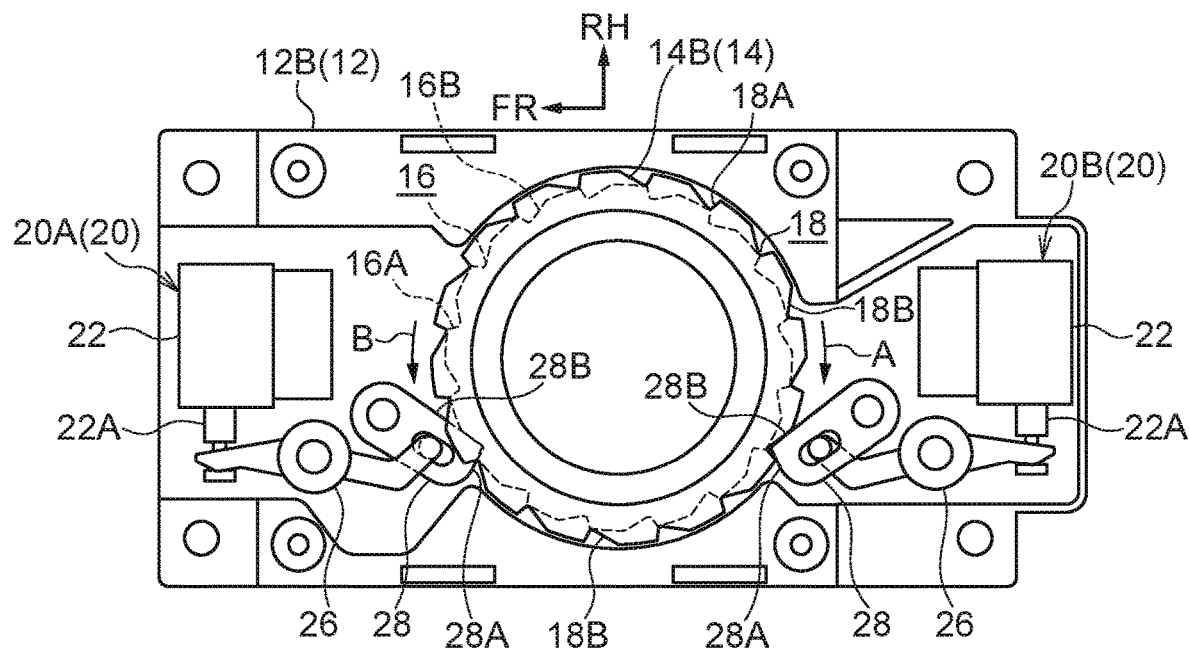
FIG. 2A is a plan view viewed from above, illustrating a state in which a knob of the shift device according to the exemplary embodiment of the present invention is restricted from rotating in one direction and another direction.
Figure 2B:
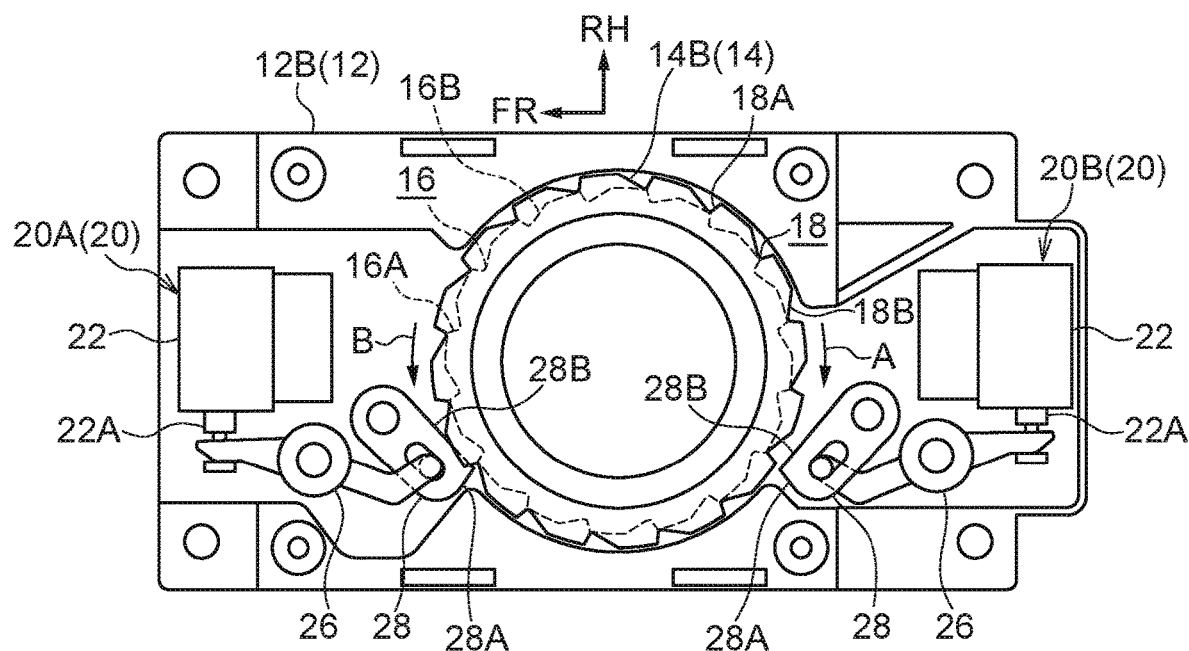
FIG. 2B is a plan view viewed from above, illustrating a state in which the knob of the shift device according to the exemplary embodiment of the present invention is permitted to rotate in one direction and another direction.

While the knob 14 is disposed at the P position, in a case in which the brake 42 is not being operated, the first mechanism 20A and the second mechanism 20B of the restriction mechanism 20 are not actuated under the control of the controller 24, such that the leading end portion of the pawl 28 of the first mechanism 20A is inserted into one of the first recesses 16 of the knob 14, and the leading end portion of the pawl 28 of the second mechanism 20B is inserted into one of the second recesses 18 of the knob 14 (see FIG. 2A). Accordingly, rotation of the knob 14 in the one direction is restricted by the pawl 28 of the first mechanism 20A, and rotation of the knob 14 in the other direction is restricted by the pawl 28 of the second mechanism 20B. Rotation of the knob 14 from the P position toward the R position side and toward the opposite side of the R position is thus restricted.

While the knob 14 is disposed at the P position, in a case in which the brake 42 has been operated, the first mechanism 20A is actuated under the control of the controller 24, and the second mechanism 20B is not actuated under the control of the controller 24. The leading end portion of the pawl 28 of the first mechanism 20A leaves the first recess 16 of the knob 14, while the leading end portion of the pawl 28 of the second mechanism 20B is inserted into the second recess 18 of the knob 14 (see FIG. 3B). The pawl 28 of the first mechanism 20A therefore permits rotation of the knob 14 in the one direction, and the pawl 28 of the second mechanism 20B permits rotation of the knob 14 in the one direction while restricting rotation of the knob 14 in the other direction. The knob 14 is thus permitted to rotate from the P position toward the R position side, and the knob 14 is restricted from rotating from the P position toward the opposite side to the R position.

While the knob 14 is disposed at the R position or at the N position, both the first mechanism 20A and the second mechanism 20B are actuated under the control of the controller 24. The leading end portion of the pawl 28 of the first mechanism 20A leaves the first recess 16 of the knob 14, and the leading end portion of the pawl 28 of the second mechanism 20B leaves the second recess 18 of the knob 14 (see FIG. 2B). The pawl 28 of the first mechanism 20A therefore permits rotation of the knob 14 in the one direction and the other direction, and the pawl 28 of the second mechanism 20B permits rotation of the knob 14 in the one direction and the other direction. The knob 14 is thus permitted to rotate from the R position toward the P position side and the N position side, or the knob 14 is permitted to rotate from the N position toward the R position side or the D position side.

While the knob 14 is disposed at the N position, in a case in which the switch 40 has been operated to restrict, neither the first mechanism 20A nor the second mechanism 20B is actuated under the control of the controller 24 (actuation is canceled). The leading end portion of the pawl 28 of the first mechanism 20A is inserted into the first recess 16 of the knob 14, and the leading end portion of the pawl 28 of the second mechanism 20B is inserted into the second recess 18 of the knob 14 (see FIG. 2A). The pawl 28 of the first mechanism 20A therefore restricts rotation of the knob 14 in the one direction, and the pawl 28 of the second mechanism 20B restricts rotation of the knob 14 in the other direction. The knob 14 is thus restricted from rotating from the N position to the R position side and toward the D position side.

While the knob 14 is disposed at the N position, in a case in which the switch 40 has been operated to release, the first mechanism 20A and the second mechanism 20B are both actuated under the control of the controller 24. The leading end portion of the pawl 28 of the first mechanism 20A leaves the first recess 16 of the knob 14, and the leading end portion of the pawl 28 of the second mechanism 20B leaves the second recess 18 of the knob 14 (see FIG. 2B). The pawl 28 of the first mechanism 20A therefore permits rotation of the knob 14 in the one direction and the other direction, and the pawl 28 of the second mechanism 20B permits rotation of the knob 14 in the one direction and the other direction. The knob 14 is thus permitted to rotate from the N position toward the R position side and toward the D position side.

As the knob 14 rotates en-route from the N position to the D position, the first mechanism 20A is not actuated (actuation is canceled) under the control of the controller 24, and the second mechanism 20B is actuated under the control of the controller 24, such that the leading end portion of the pawl 28 of the first mechanism 20A is inserted into one of the first recesses 16 of the knob 14, and the leading end portion of the pawl 28 of the second mechanism 20B leaves the second recess 18 of the knob 14 (see FIG. 3A). The pawl 28 of the first mechanism 20A therefore restricts rotation of the knob 14 in the one direction and permits rotation of the knob 14 in the other direction, and the pawl 28 of the second mechanism 20B permits rotation of the knob 14 in the other direction. The knob 14 is thus restricted from rotating from the D position toward the opposite side to the N position, and the knob 14 is permitted to rotate from the D position toward the N position side.

Suppose that while the knob 14 has already rotated beyond the D position in the one direction, the leading end portion of the pawl 28 of the first mechanism 20A is inserted into one of the first recesses 16 of the knob 14, thereby restricting rotation of the knob 14 in the one direction. In such a case, under the control of the controller 24, the shift position at the rotation position where the knob 14 is restricted is reconfigured as the D position, and the shift positions on the other direction side of this rotation position of the knob 14 are reconfigured as the N position, the R position, and the P position, in this sequence. Moreover, while the knob 14 has been rotated in the one direction beyond the D position, the indicator 38 continues to display the shift position of the knob 14 as the D position under the control of the controller 24.

As the knob 14 rotates en-route from the R position toward the P position, the first mechanism 20A is actuated under the control of the controller 24, and the second mechanism 20B is not actuated (actuation is canceled) under the control of the controller 24, such that the leading end portion of the pawl 28 of the first mechanism 20A leaves the first recess 16 of the knob 14, and the leading end portion of the pawl 28 of the second mechanism 20B is inserted into one of the second recesses 18 of the knob 14 (see FIG. 3B). The pawl 28 of the first mechanism 20A therefore permits rotation of the knob 14 in the one direction, and the pawl 28 of the second mechanism 20B permits rotation of the knob 14 in the one direction and restricts rotation of the knob 14 in the other direction. The knob 14 is thus restricted from rotating from the P position toward the opposite side to the R position, and the knob 14 is permitted to rotate from the P position toward the R position side.

Suppose that while the knob 14 has been rotated beyond the P position in the other direction, the leading end portion of the pawl 28 of the second mechanism 20B is inserted into one out of the second recesses 18 of the knob 14, thereby restricting rotation of the knob 14 in the other direction. In such a case, the shift position at the rotation position where the rotation of the knob 14 is restricted is reconfigured as the P position under the control of the controller 24, and the shift positions on the one direction side of this rotation position of the knob 14 are reconfigured as the R position, the N position, and the D position, in this sequence, under the control of the controller 24. Moreover, while the knob 14 has been rotated in the other direction beyond the P position, the indicator 38 continues to display the shift position of the knob 14 as the P position under the control of the controller 24.

Moreover, while the knob 14 is disposed at a shift position other than the P position (for example, at the D position), in a case in which the engine 36 is switched OFF (at a predetermined stimulus), the shift range of the automatic transmission 34 is automatically changed from the range other than the P range (for example, the D range) to the P range under the control of the controller 24.

When the engine 36 is turned ON, the shift position at the rotation position where the knob 14 is disposed is set as the P position under the control of the controller 24, and the shift positions on the one direction side of this rotation position of the knob 14 are set as the R position, the N position, and the D position, in this sequence, under the control of the controller 24. Accordingly, even supposing the engine 36 was switched OFF while the knob 14 was disposed at a shift position other than the P position, when the engine 36 is switched ON, the shift position of the knob 14 is reconfigured as the P position, and this is reflected in the shift range of the automatic transmission 34.

Note that the restriction mechanism 20 is provided with the first mechanism 20A and the second mechanism 20B, and the drive devices of the restriction mechanism 20 are configured solely by the solenoid 22 of the first mechanism 20A and the solenoid 22 of the second mechanism 20B. This thereby enables the number of drive devices in the restriction mechanism 20 to be reduced, and enables the configuration of the restriction mechanism 20 to be simplified.

Moreover, as described above, in a case in which the rotation of the knob 14 in the one direction has passed the D position and then been restricted, the shift position at the position where rotation of the knob 14 is restricted is reconfigured as the D position under the control of the controller 24. The need to rotate the knob 14 in the other direction to set the shift position of the knob 14 to the D position can thereby be eliminated.

Moreover, as described above, in a case in which the rotation of the knob 14 in the other direction has passed the P position and then been restricted, the shift position at the position where rotation of the knob 14 was restricted is reconfigured as the P position under the control of the controller 24. The need to rotate the knob 14 in the one direction to set the shift position of the knob 14 to the P position can thereby be eliminated.

Moreover, as described above, in a case in which the engine 36 has been switched OFF while the knob 14 is disposed at a shift position other than the P position, when the engine 36 is turned ON, the shift position of the knob 14 is reconfigured from the position other than the P position to the P position under the control of the controller 24. Accordingly, the shift position of the knob 14 can be set to the P position without driving rotation of the knob 14, enabling a situation in which, for example, the knob 14 is not rotated to the P position as a result of external factors limiting rotation of the knob 14 to be suppressed.

Moreover, the restriction mechanism 20 (the first mechanism 20A and the second mechanism 20B) is disposed at the outside (rotation-radial direction outside) of the knob 14. This thereby enables the indicator 38 and the switch 40 to be disposed at the inside (rotation-radial direction inside) of the knob 14 instead of the restriction mechanism 20.

Note that in the present exemplary embodiment, rotation of the knob 14 in the one direction or the other direction can be restricted while the knob 14 is disposed at the P position or the N position. However, configuration may be made such that rotation of the knob 14 in the one direction or the other direction or in one of the one direction or the other direction can be restricted while the knob 14 is disposed at a shift position other than the P position or the N position. Furthermore, configuration may be made such that rotation of the knob 14 in one of the one direction or the other direction can be restricted while the knob 14 is disposed at the N position.

Moreover, in the present exemplary embodiment, the knob 14 (shift body) is rotated. However, the shift body may be swung, or may slide.

Moreover, in the present exemplary embodiment, the shift device 10 is installed to the console. However, the shift device 10 may be installed to an instrument panel or to a column cover.

What is claimed is:

1. A shift device comprising:
   a shift body that is movable in one direction or another direction, in a range between a restriction shift position of one direction side and a restriction shift position of another direction side, to change a shift position; and
   a restriction mechanism that includes a first mechanism with an action toward a lateral direction of the shift body to restrict movement of the shift body in the one direction and to permit movement of the shift body in the other direction, and a second mechanism with another action toward the lateral direction of the shift body to restrict movement of the shift body in the other direction and to permit movement of the shift body in the one direction, wherein the lateral direction of the shift body is orthogonal to a height of the shift body, wherein, in a case in which movement of the shift body in the one direction has been restricted, by the first mechanism, at a physical position of the shift body which is beyond the restriction shift position of the one direction side and at which the shift position of the shift body has not been set when the shift body has moved within the range, a controller sets the shift position of the shift body so as to be at the restriction shift position of the one direction side.

2. The shift device of claim 1, wherein, at a predetermined stimulus, the shift position of the shift body is reconfigured as a predetermined shift position without moving the shift body.

3. The shift device of claim 1, wherein the restriction mechanism is disposed outside the shift body.

\* \* \* \* \*